United States Patent [19]

Chonan

[11] Patent Number: 4,917,397

[45] Date of Patent: Apr. 17, 1990

[54] STRUCTURE FOR THREADING A CABLE THROUGH A BICYCLE FRAME

[75] Inventor: Yoshiya Chonan, Souka, Japan

[73] Assignee: Sakae Ringyo Co., Ltd., Tokyo, Japan

[21] Appl. No.: 169,063

[22] Filed: Mar. 17, 1988

[30] Foreign Application Priority Data

Jul. 20, 1987 [JP] Japan .................. 62-111155

[51] Int. Cl.$^4$ .......................................... B62K 19/30
[52] U.S. Cl. .................... 280/281.1; 74/487; 74/489
[58] Field of Search ............... 280/281.1; 403/13, 14; 74/502.6, 489, 488, 487, 486

[56] References Cited

U.S. PATENT DOCUMENTS

| | | | |
|---|---|---|---|
| 1,397,682 | 11/1921 | Geier et al. | 74/488 |
| 1,405,107 | 1/1922 | Franklin | 74/551.1 |
| 1,506,388 | 8/1924 | Smith | 74/489 |
| 4,005,613 | 2/1977 | Kaufman et al. | 74/489 |
| 4,019,402 | 4/1977 | Leonhart | 74/489 |
| 4,066,147 | 1/1978 | Toyomoto | 74/489 X |
| 4,132,296 | 1/1979 | Evett | 74/489 X |
| 4,462,267 | 7/1984 | Shimano | 74/489 |
| 4,565,383 | 1/1986 | Isaac | 280/281 X |
| 4,585,246 | 4/1986 | Diekman et al. | 280/281 R |
| 4,768,798 | 9/1988 | Reed et al. | 280/281.1 |

FOREIGN PATENT DOCUMENTS

| | | | |
|---|---|---|---|
| 50671 | 2/1941 | France | 280/281.1 |
| 411083 | 6/1945 | Italy | 280/281 R |
| 419902 | 4/1947 | Italy | 74/489 |
| 541906 | 12/1941 | United Kingdom | 74/489 |

Primary Examiner—Mitchell J. Hill
Attorney, Agent, or Firm—Lowe, Price, LeBlanc, Becker & Shur

[57] ABSTRACT

A cable threading structure of a bicycle frame includes a pair of members and a tube which do not communicate with each other. A cable inlet is formed in one of the members or in the tube near one of the members and a cable outlet is formed in the other of the members or in the tube near the other member. A cable threading exit opening having a diameter which is gradually reduced communicates with the cable outlet to lead a cable to the cable outlet so that the cable is inserted into the tube.

7 Claims, 4 Drawing Sheets

STRUCTURE FOR THREADING A CABLE THROUGH A BICYCLE FRAME

FIELD OF THE INVENTION

The present invention relates to a structure for threading a cable through a bicycle frame.

BACKGROUND OF THE INVENTION

Cables for actuating a brake device and a gearbox by being inserted into tubes constituting a bicycle frame so as to prevent corrosion of the cables and improve the aesthetic appearance of the bicycle (are known (e.g.) U.S. Pat. No. 4,585,246).

FIG. 5 depicts a conventional structure for threading a cable through the bicycle frame. In FIG. 5, a lug 1a of a head tube 1 is fitted into an end of a top tube 2 and a lug 3a of a seat bracket 3 is also fitted into the other end of the top tube 2. The lug 1a is formed with a cable outlet 4 and the lug 3a is formed with a cable inlet 5.

A cable 6 for a brake device is pushed into the top tube 2 through the cable inlet 5 and the leading tip 6a of the cable 6 is then pushed out from the cable outlet 4 with the cable 6 threaded in the top tube 2.

The cable inlet 5 and the cable outlet 4 may be formed in the top tube 2.

In order to push out the leading tip 6a of the cable 6 from the cable outlet 4, it is necessary to form a through hole 7 in the head tube 1 to communicate the head tube 1 with the top tube 2. Thus, a finger is inserted into the head tube 1 to guide the leading tip 6a of the cable 6 toward the cable outlet 4 with the tip of the finger while the cable 6 is pushed so that the leading tip 6a of the cable 6 is pushed out from the outlet 4.

However, when the leading tip 6a of the cable 6 is guided with the finger tip as described above, it is difficult to move the finger in the head tube 1 and the top tube 2 freely due to smallness of the through hole 7. Accordingly, considerable labor and time are required to thread the cable 6 through the top tube 2.

Further, as depicted in FIG. 6, a spoke 8 (or a small-diameter rod) of the bicycle is inserted into the cable outlet 4 and the leading tip of the spoke 8 is fitted into the leading tip of the cable 6. Thus, the leading tip of the cable 6 is pushed out from the cable outlet 4 while being guided toward the cable outlet 4 with the spoke 8. Such an operation of threading the cable is suitable when the finger cannot be inserted into the head tube 1 or the finger cannot reach the leading tip 6a of the cable 6. However, it is very difficult to insert the spoke 8 into the leading tip 6a of the cable 6 since the leading tip 6a of the cable 6 moves, and hence considerable labor and time are required.

SUMMARY OF THE INVENTION

It is an object of the present invention to provide a structure of a bicycle frame enabling easy of threading of a cable through a tube.

According to the present invention, since a cable outlet includes a cable leading opening having a diameter which is gradually reduced and communicating therewith to lead a cable to the cable outlet, the cable can be threaded through a tube efficiently and easily, and an old cable can be also replaced by a new cable with ease even in a finished bicycle.

DETAILED DESCRIPTION OF THE PREFERRED EMBODIMENTS

Embodiments of the present invention are now described in detail with reference to the drawings.

Figure 1A:
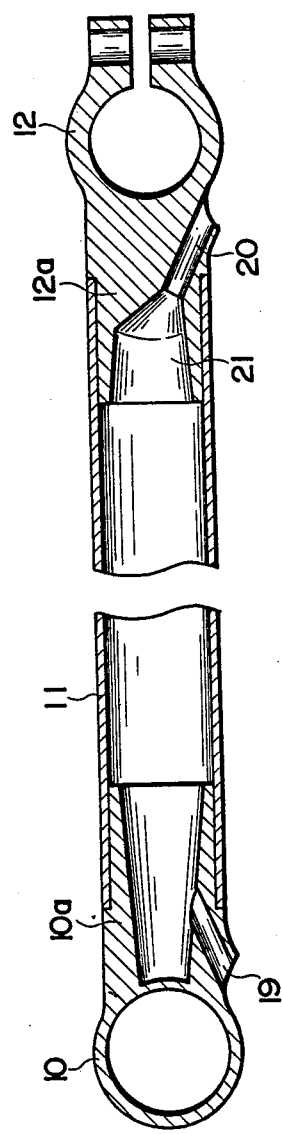
FIGS. 1(A) and 1(B) are a sectional view and a front view of a part of a bicycle frame including a structure for threading a cable according to the present invention, respectively.
Figure 1:
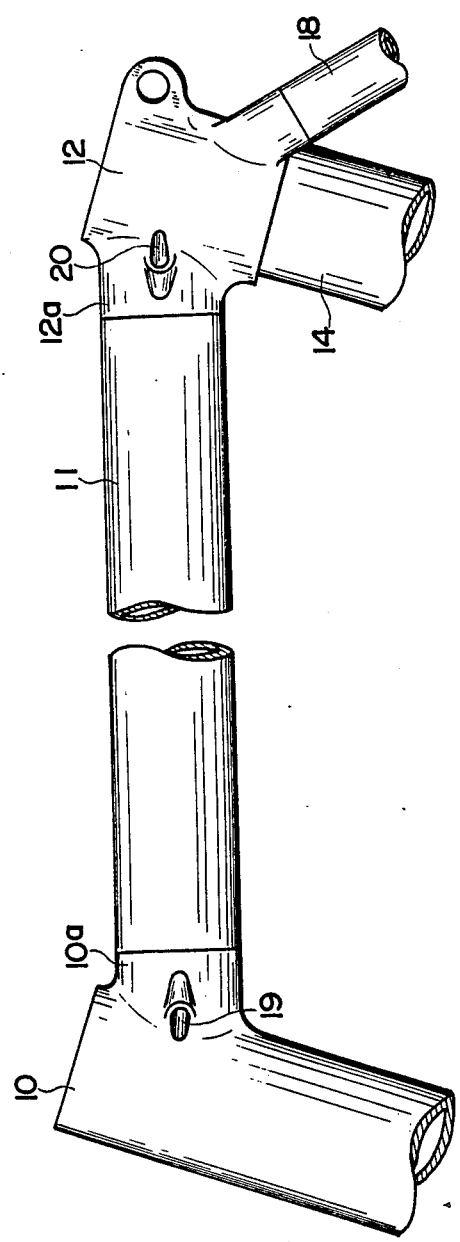
Figure 3:
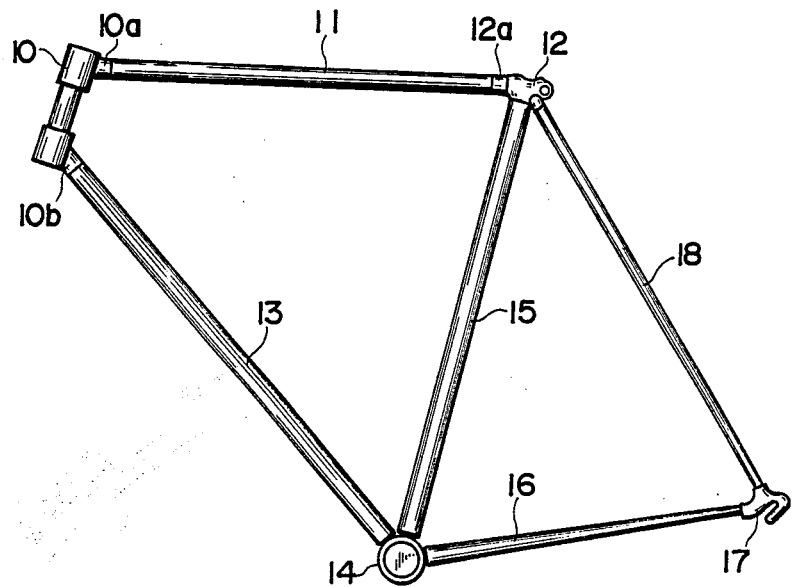
FIG. 3 depicts a bicycle frame.

Referring to FIG. 3, there is shown a whole structure of a bicycle frame including a head tube 10 made of aluminum. Lugs 10a and 10b are integrally formed at the upper and lower portions of the head tube 10. As shown in FIGS. 1(A) and 1(B), the lug 10a is fitted into an end of a top tube 11 and the other end of the top tube 10 is fitted onto a lug 12a of a seat bracket 12. The other lug 10b of the head tube 10 is fitted into an end of a down tube 13 and the other end of the down tube 13 is fitted onto a lug of a bottom bracket 14. Another lug of the bottom bracket 14 is fitted into a lower end of a seat tube 15 and an upper end of the seat tube 15 is fitted onto the other lug (not shown) of the seat bracket 12. Still another lug (not shown) of the bottom bracket 14 is fitted into an end of a chain stay 16 and the other end of the chain stay 16 is fitted onto a lug (not shown) of a coupling member 17.

Further, the other lug of the coupling member 17 and a small-diameter lug of a seat bracket 12 are forcedly inserted into both ends of a back fork 18.

The head tube 10 does not communicate with the top tube 11 as shown in FIGS. 1(A) and 1(B) and the lug 10a is formed with a cable inlet 19 formed of a through hole. Further, the seat bracket 12 does not communicate with the top tube 11 and the lug 12a of the seat bracket 12 is formed with a cable outlet 20 formed of a through hole and is further formed with a cable leading threading exit opening 21 having a diameter which is gradually reduced to be formed into a funnel shape and which communicates, at an small-diameter end thereof, with the cable outlet 20. The cable inlet 19, the cable outlet 20 and the cable threading exit opening 21 constitute the structure for threading a cable through a tube.

Figure 2A:
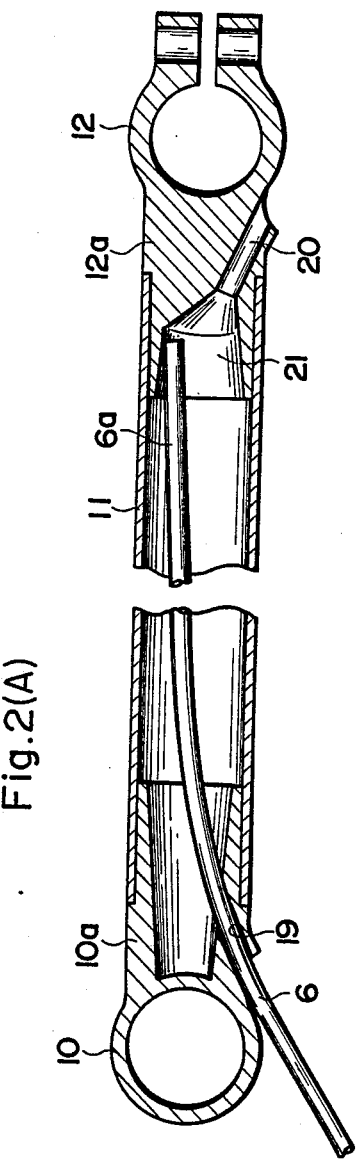
FIGS. 2(A) and 2(B) are sectional views illustrating operations of threading a cable through a tube in the structure shown in FIG. 1.
Figure 2B:
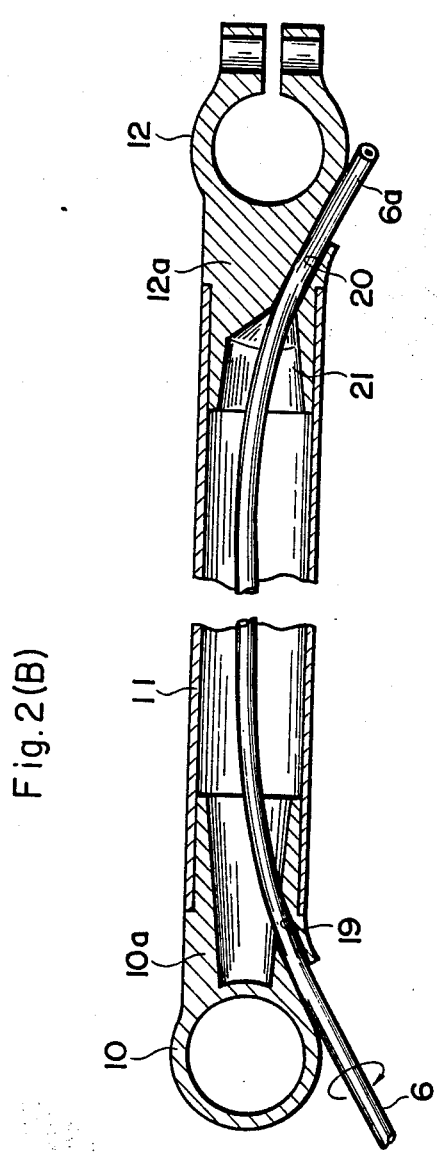

FIGS. 2(A) and 2(B) are sectional views for illustrating operation of threading a cable through a tube. In FIGS. 2(A) and 2(B), there is shown a cable 6 for a brake device. The cable 6 is first inserted into the cable inlet 19 as shown in FIG. 2(A) and is pushed into the top tube 11. When the leading tip 6a of the cable 6 abuts against the inner wall near the cable threading exit opening 21 in the lug 12a of the seat bracket 12, the cable 6 is further pushed into the tube while being turned as shown in FIG. 2(B). Consequently, since the cable threading exit opening 21 is formed into a funnel, the leading tip 6a of the cable 6 is automatically guided along the wall of the cable threading exit opening 21 to the cable outlet 20 so that the leading tip 6a of the cable 6 is pushed out from the outlet 20. Thus, the cable can be easily received in the top tube 11 with high operation efficiency. Further, since it is not necessary to insert a finger into the tube and guide the cable with the finger, the cable can be easily inserted and received even in the case of a bicycle equipped with a head fork for attaching a handlebar to the head tube 10 and equipped with a seat pillar fitted into the seat bracket 12. Accordingly, the assembling work of the bicycle can be improved and it is not necessary to disassemble the bicycle even when the cable 6 is later replaced.

Figure 4:
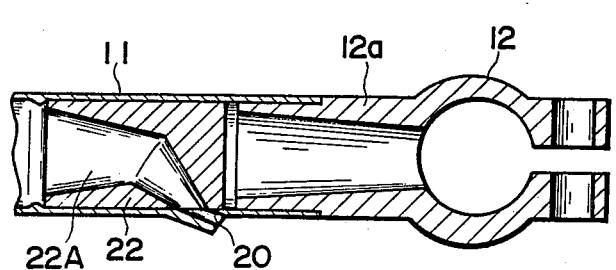
FIG. 4 is a sectional view of another embodiment according to the present invention.
Figure 5:
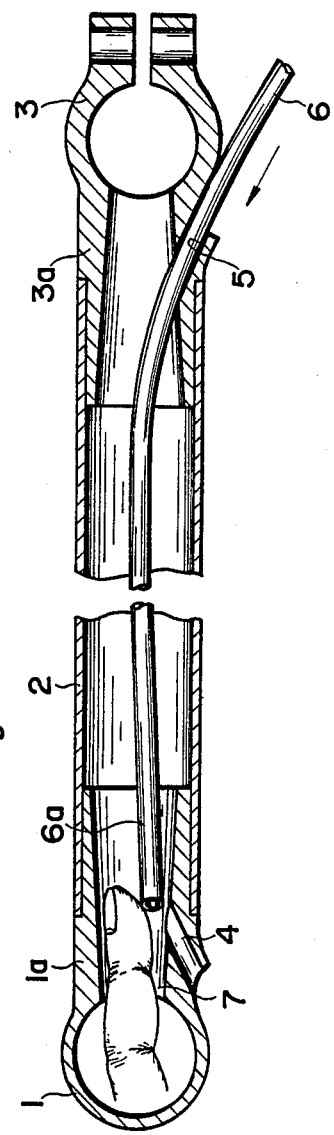
FIGS. 5 and 6 are sectional views illustrating different operations of threading a cable through a tube in a conventional structure, respectively.
Figure 6:
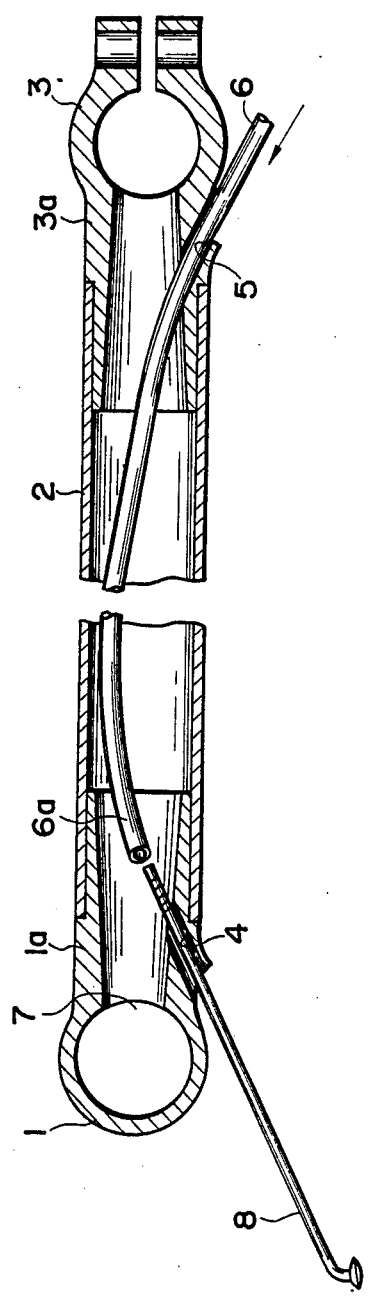

FIG. 4 depicts another embodiment of the present invention, in which the cable outlet 20 is formed in an end of the top tube 11 and a threading member 22 for leading the cable is fitted into the top tube 11. The cylindrical member 22 is formed with a funnel-shaped cable threading exit opening 22A and a small-diameter end of the opening 22A communicates with the cable outlet 20.

If the cable outlet 20 is formed in the lug 12a of the seat bracket 12, the member 22 including the cable threading exit 22A may be fitted into the lug 12a.

Further, the cable threading exit opening 21 or 22A may be tapered. Namely, the cable threading exit opening may be formed with a diameter which is gradually reduced and may communicate with the cable outlet 20.

When a cable for actuating a gearbox is inserted into the down tube 13, the cable inlet 19 and the cable outlet 20 are formed in both ends of the down tube 13 or the other lug 10b of the head tube 10 and the lug of the bottom bracket 14, respectively, and the cable threading exit opening 21 (22A) is formed to communicate with the cable outlet 20.

I claim:

1. In a bicycle frame having connecting members and tubes, at least one of the tubes having opposite ends respectively connected to a pair of said connecting members which opposite ends and connecting members define end portions at said opposite ends of said at least one tube to which end portions others of said tubes are connected to establish the frame, and at least one cable threaded through an interior region of said at least one tube defined by a wall of said at least one tube, the improvement comprising a cable inlet opening formed in one of said end portions in communication with said interior region and a cable outlet formed in the other of said end portions, and means for defining a cable threading exit opening in said other end portion adjacent the cable outlet and in communication with said interior region, said cable threading exit opening means having tapered side walls communicating with said interior region and establishing a gradually decreasing diameter in the direction of said cable outlet and communicating with said cable outlet to enable the cable to be guided by said tapered side walls and thereby threaded through the cable threading exit opening means into said outlet, wherein said tapered side walls of the cable threading exit opening means has a largest diameter located furthest from the cable outlet and which largest diameter is approximately equal to the inner diameter of the interior region located immediately adjacent thereto.

2. A structure for threading a cable through a bicycle frame according to claim 1, wherein said cable threading exit opening means if formed together with said cable outlet in said connecting member in the said outer of said end portions.

3. A structure for threading a cable through a bicycle frame according to claim 1, wherein said cable threading exit opening means includes a threading member having said tapered side walls which threading member is fitted into the interior region of said tube adjacent said connecting member in the other of said end portions.

4. In the bicycle frame of claim 1, wherein said connecting member in said other of said end portions includes an opening adapted to receive another of said tubes, and wall means in said connecting member of said other of said end portions for preventing communication between said interior region and said opening.

5. In the bicycle frame of claim 1, wherein the cable outlet through which an end of said threaded cable exits the said other end portion is offset in relation to a longitudinal axis of the interior region.

6. An assembly comprising at least one tube and a pair of connecting members connected to opposite ends of said tube, which opposite ends and connecting members define end portions at said opposite ends of said at least one tube, said tube having a hollow interior region and at least one cable threaded through said interior region, a cable inlet opening formed in one of said end portions in communication with said interior region and a cable outlet formed in the other of said end portions, said cable extending through said cable inlet and said interior region and said outlet, and means for defining a cable threading exit opening in said interior region in said other end portion adjacent the cable outlet, said cable threading exit opening means having tapered side walls establishing a gradually decreasing diameter in the direction of said cable outlet and communicating with said cable outlet to enable the cable to be guided by said tapered side walls and thereby threaded through the cable threading exit opening means into said outlet, wherein said tapered side walls of the cable threading exit opening means has a largest diameter located furthest from the cable outlet and which largest diameter is approximately equal to the inner diameter of the interior region located immediately adjacent thereto.

7. The assembly of claim 6, wherein the cable outlet through which an end of said threaded cable exits the said other end portion is offset in relation to a longitudinal axis of the interior region.

* * * * *